(12) United States Patent
Sharifi Mehr

(10) Patent No.: US 10,055,591 B1
(45) Date of Patent: Aug. 21, 2018

(54) SECURE PROTOCOL ATTACK MITIGATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/863,391

(22) Filed: Sep. 23, 2015

(51) Int. Cl.
*G06F 11/00* (2006.01)
*G06F 21/57* (2013.01)
*G06F 21/62* (2013.01)
*G06F 21/31* (2013.01)

(52) U.S. Cl.
CPC .......... *G06F 21/577* (2013.01); *G06F 21/31* (2013.01); *G06F 21/6209* (2013.01); *G06F 2221/2133* (2013.01)

(58) Field of Classification Search
CPC .......... G06F 2221/2133; H04L 9/3013; H04L 9/3218
See application file for complete search history.

(56) References Cited

U.S. PATENT DOCUMENTS

| 8,555,353 | B2* | 10/2013 | Von Ahn | G06F 21/36 726/5 |
| 8,925,057 | B1* | 12/2014 | Ansari | G06F 21/31 382/181 |
| 9,064,124 | B1 | 6/2015 | Davis et al. | |
| 9,147,065 | B2* | 9/2015 | Lauer | G06F 21/36 |
| 9,202,076 | B1* | 12/2015 | Chazin | G06F 21/6218 |
| 2007/0192849 | A1* | 8/2007 | Golle | G06F 21/34 726/16 |
| 2007/0250920 | A1* | 10/2007 | Lindsay | G06F 21/31 726/7 |
| 2008/0263361 | A1* | 10/2008 | Dutta | H04L 9/0891 713/182 |
| 2010/0144314 | A1* | 6/2010 | Sherkin | G06Q 20/3226 455/411 |
| 2010/0161927 | A1* | 6/2010 | Sprouse | G06F 21/36 711/163 |

(Continued)

OTHER PUBLICATIONS

Harris, B., "RSA Key Exchange for the Secure Shell (SSH) Transport Layer Protocol," Request for Comments: 4432, Standards Track, Mar. 2006, 8 pages.

(Continued)

*Primary Examiner* — Techane Gergiso
(74) *Attorney, Agent, or Firm* — Davis Wright Tremaine LLP

(57) ABSTRACT

A handshake for establishing a secure connection between a client computer system and a service includes a CAPTCHA element. When the client computer system initiates the secure connection to the service, the service responds by generating a key seed and providing the key seed to the client computer system in the form of the CAPTCHA element. The CAPTCHA element is solvable by a human user at the client computer system to obtain a solution. The solution to the CAPTCHA is used to recover the key seed. The client and the server use the key seed to generate an encryption key which is used to encrypt communications between the client computer system and the service.

20 Claims, 11 Drawing Sheets

(56) References Cited

U.S. PATENT DOCUMENTS

| | | | | |
|---|---|---|---|---|
| 2010/0201478 | A1* | 8/2010 | Veen | G06F 21/36 340/3.1 |
| 2010/0325427 | A1* | 12/2010 | Ekberg | H04L 9/321 713/156 |
| 2011/0055585 | A1* | 3/2011 | Lee | 713/183 |
| 2012/0254971 | A1* | 10/2012 | Hu | G06F 21/36 726/9 |
| 2012/0291122 | A1* | 11/2012 | Chow | G06F 21/36 726/19 |
| 2012/0323700 | A1* | 12/2012 | Aleksandrovich | G06Q 30/00 705/14.69 |
| 2013/0097697 | A1* | 4/2013 | Zhu | G06F 21/36 726/18 |
| 2013/0160095 | A1* | 6/2013 | Seleznyov | G06F 21/36 726/5 |
| 2014/0245005 | A1* | 8/2014 | Dottax | G06F 21/46 713/168 |
| 2014/0304797 | A1* | 10/2014 | Fu | H04L 63/0823 726/10 |
| 2016/0055328 | A1* | 2/2016 | Shen | H04L 9/0866 713/168 |

OTHER PUBLICATIONS

Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.

Blake-Wilson, S., et al., "Elliptic Curve Cryptography (ECC) Cipher Suites for Transport Layer Security (TLS)," Request for Comments: 4492, Informational, May 2006, 35 pages.

Santesson, S., "TLS Handshake Message for Supplemental Data," Request for Comments: 4680, Standards Track, Sep. 2006, 9 pages.

Santesson, S., et al., "TLS User Mapping Extension," Request for Comments: 4681, Standards Track, Oct. 2006, 11 pages.

Galbraith, J. and R. Thayer, "The Secure Shell (SSH) Public Key File Format," Request for Comments: 4716, Nov. 2006, 11 pages.

Blumenthal, U., and P. Goel, "Pre-Shared Key (PSK) Ciphersuites with NULL Encryption for Transport Layer Security (TLS)," Request for Comments: 4785, Standards Track, Jan. 2007, 5 pages.

Galbraith, J., et al., "Secure Shell Public Key Subsystem," Request for Comments: 4819, Standards Track, Mar. 2007, 18 pages.

Taylor, D., et al., "Using the Secure Remote Password (SRP) Protocol for TLS Authentication," Request for Comments: 5054, Informational, Nov. 2007, 25 pages.

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA-256/384 and AES Galois Counter Mode (GCM)," Request for Comments: 5289, Informational, Aug. 2008, 7 pages.

Igoe, K., and J. Solinas, "AES Galois Counter Mode for the Secure Shell Transport Layer Protocol," Request for Comments: 5647, Informational, Aug. 2009, 10 pages.

Stebiula, D., and J. Green, "Elliptic Curve Algorithm Integration in the Secure Shell Transport Layer," Request for Comments: 5656, Standards Track, Dec. 2009, 19 pages.

Rescorla, E., et al., "Transport Layer Security (TLS) Renegotiation Indication Extension," Request for Comments: 5746, Standards Track, Feb. 2010, 16 pages.

Mcgrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Eastlake, E., "Transport Layer Security (TLS) Extensions: Extension Definitions," Request for Comments: 6066, Standards Track, Jan. 2011, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Igoe, K., and D. Stebila, "X.509v3 Certificates for Secure Shell Authentication," Request for Comments: 6187, Standards Track, Mar. 2011, 17 pages.

Kim, W., et al., "Addition of the ARIA Cipher Suites to Transport Layer Security (TLS)," Request for Comments: 6209, Informational, Apr. 2011, 10 pages.

Igoe, K., "Suite B Cryptographic Suites for Secure Shell (SSH)," Request for Comments: 6239, Informational, May 2011, 15 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

McGrew, D., and D. Bailey, "AES-CCM Cipher Suites for Transport Layer Security (TLS)," Request for Comments: 6655, Standards Track, Jul. 2012, 8 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Ahn, L.V., et al., "reCAPTCHA: Human-Based Character Recognition via Web Security Measures," Science 321:1465-1468, Sep. 12, 2008.

Ahn, L.V., et al., "Telling Humans and Computers Apart Automatically," Communications of the ACM 47(2):57-60, Feb. 2004.

"Captcha," Wikipedia, The Free Encyclopedia, <https://en.wikipedia.org/wiki/CAPTCHA> [retrieved Sep. 23, 2015], 5 pages.

Datta, R., et al., "Imagination: A Robust Image-Based Captcha Generation System," Proceedings of the 13th Annual ACM International Conference on Multimedia, New York, New York, © 2005, pp. 331-334.

"Hash-Based Message Authentication Code," Wikipedia, The Free Encyclopedia, <https://en.wikipedia.org/wiki/Hash-based_message_authentication_code> [retrieved Sep. 23, 2015], 7 pages.

(56) References Cited

OTHER PUBLICATIONS

Huang, S.-Y., et al., "An Efficient Segmentation Algorithm for CAPTCHAs With Line Cluttering and Character Warping," Multimedia Tools and Applications 48(2):267-289, Jun. 2010.
"Key Stretching," Wikipedia, The Free Encyclopedia, <https://en.wikipedia.org/wiki/Key_stretching> [retrieved Sep. 23, 2015], 4 pages.
Kumar, M., and R. Dhir, "Design and Comparison of Advanced Color Based Image CAPTCHAs," International Journal of Computer Applications (0975-8887) 61(15):24-29, Jan. 2013.
Motoyama, M., et al., "Re: CAPTCHAs—Understanding CAPTCHA-Solving Services in an Economic Context," Proceedings of the 19th USENIX Conference on Security, Aug. 11-13, 2010, Washington, DC, 18 pages.
"PBKDF2," Wikipedia, The Free Encyclopedia, <https://en.wikipedia.org/wiki/PBKDF2> [retrieved Sep. 23, 2015], 5 pages.
Rao, M., and N. Singh, "Random Handwritten CAPTCHA: Web Security With a Difference," I.J. Information Technology and Computer Science 9:53-58, 2012.
"Script," Wikipedia, The Free Encyclopedia, <https://en.wikipedia.org/wiki/Script> [retrieved Sep. 23, 2015], 4 pages.
McClintock, J.A., et al., "Human Readable Mechanism for Communicating Binary Data," U.S. Appl. No. 14/470,886, filed Aug. 27, 2014.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 80 pages.
Kent, S., "Security Architecture for the Internet Protocol," Request for Comments: 2401, Standards Track, Nov. 1998, 62 pages.
Orman, H., "The Oakley Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 15 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 7 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 7 pages.
Blake-Wilson, S., et al., "Transport Layer Security (TLS) Extensions," Request for Comments: 3546, Standards Track, Jun. 2003, 29 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 7 pages.
Lee, H.J., et al., "Addition of SEED Cipher Suites to Transport Layer Security (TLS)," Request for Comments: 4162, Standards Track, Aug. 2005, 6 pages.
Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authenication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 15 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (Esp)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 25 pages.
Blake-Wilson, S., et al., "Transport Layer Security (TLS) Extensions," Request for Comments: 4366, Standards Track, Apr. 2006, 30 pages.
Friedl, M., et al., "Diffie-Hellman Group Exchange for the Secure Shell (SSH) Transport Layer Protocol," Request for Comments: 4419, Standards Track, Mar. 2006, 10 pages.

\* cited by examiner

SECURE PROTOCOL ATTACK MITIGATION

BACKGROUND

Secure network communications are an important feature of modern computing environments. To provide secure network communications, a variety of secure network protocols have been developed that attempt to validate the identities of the parties to a communication, and then attempt to secure the content of the network communications through encryption. Some attackers deploy automated systems that attempt to intercept secure network connections. Limiting the impact of automated attacks on secure network communications is a challenging problem.

In one type of attack, the attacker attempts to impersonate a legitimate service on the network by deploying a decoy service, and attempts to intercept or redirect connection requests from a legitimate client to the decoy service. If the attacker successfully directs a connection request of a legitimate client to the decoy service, the legitimate client sends information to the attacker's decoy service, believing that the decoy service is the legitimate service. To respond to the legitimate client, the decoy service establishes a connection to the legitimate service, and relays information received from the legitimate client to the legitimate service. Responses received from the legitimate service are relayed to the legitimate client. If successful, the attacker is able to act as a man-in-the-middle, decoding and viewing communications between the legitimate client and legitimate service in plaintext form.

Man-in-the-middle attacks can be particularly devastating when the attacker is able to convincingly impersonate the legitimate service. This can occur if the public-private key cryptosystems which secure transport channels such as Transport Layer Security ("TLS") or Secure Sockets Layer ("SSL") become compromised. For example, if legitimate clients of a service trust a public-key, and the private-key corresponding to the public-key becomes accessible to an attacker, such as by using certificates signed by a compromised certificate authority ("CA"), a convincing decoy service can be created by the attacker. If the operation of the attack can be automated using the decoy service, the attacker may be able to quickly scale up the attack and compromise many client-service connections using the single decoy service.

BRIEF DESCRIPTION OF THE DRAWINGS

Various techniques will be described with reference to the drawings, in which.

DETAILED DESCRIPTION

Figure 1:
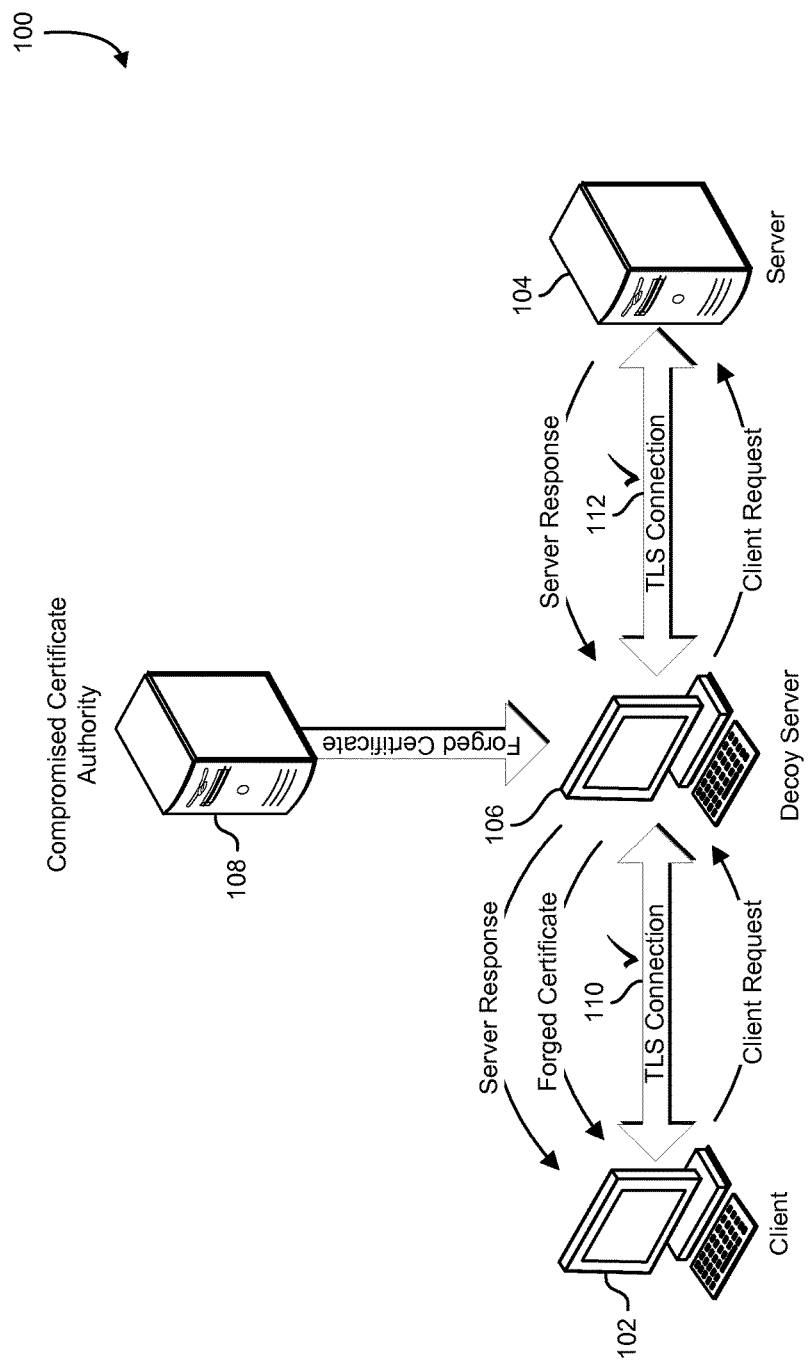
FIG. 1 shows an illustrative example of an environment in which various embodiments may be practiced.

The current document describes various systems and methods that can mitigate the effectiveness of an automated attack on a secure network connection by including a CAPTCHA as part of a handshake that establishes the secure network connection. In one example, a client requests a secure connection to a service. The service, as a result of receiving the connection request, generates a key seed value that will be used at least in part to encrypt communications between the client and the service. The service provides the key seed value to the client in the form of a CAPTCHA problem, so that the solution to the CAPTCHA problem produces the key seed value. Communications between the client and the service are encrypted using a master key that is based at least in part on the key seed value, which is acquired by the client by solving the CAPTCHA. If the CAPTCHA is not correctly solved by the client, the master key is not acquired by the client and the connection fails.

In one attack scenario, an attacker acts as a man-in-the-middle with the intention of intercepting unencrypted communications between a client and an online service. The attacker acquires a forged digital certificate that is associated with the online service. The forged digital certificate may be acquired by breaching the security of the online service or by breaching the security of a trusted Certificate Authority ("CA"). Using the forged digital certificate, the attacker deploys a decoy service that purports to be the online service. The client, mistakenly believing that the decoy service is the online service, initiates a Transport Layer Security ("TLS") connection to the decoy service. The decoy service provides the forged digital certificate to the client to convince the client that the decoy service is the online service. In order to observe the communication between the client and the online service, the decoy service initiates a TLS connection to the online service and impersonates the client. As part of the TLS handshake, the decoy service and the online service agree to negotiate a pre-master secret. The online service generates a key seed value, and provides the key seed value to the decoy service in the form of a CAPTCHA problem. The pre-master secret and the key seed value are used by both the online service and the decoy service to generate a master secret key. If the decoy service is an automated system, it will be difficult for the decoy service to solve the CAPTCHA problem. Without the key seed value, the decoy service cannot generate the master secret key that is used for further communications, and the TLS connection between the online service and the decoy service will fail. In situations where the attacker has acquired a forged digital certificate, large-scale fully automated attacks may be possible once the decoy server is deployed. By forcing the attacker to solve a CAPTCHA as part of a successful attack, the number of successful attacks can be limited by the manpower available to the attacker.

The online service can use a number of additional factors to detect an automated attack. In some examples, the online service generates a signature based at least in part on the application program used by the client to access the online service. In another example, the online service generates a signature based at least in part on the network connection used by the client to access the online service. The online service can use the signatures to determine a metric which indicates a likelihood that the client's interaction with the online service is the result of an automated process.

The online server can provide the CAPTCHA to the client in a variety of ways. In some examples, the online server provides the CAPTCHA within an extension to the TLS handshake. In one implementation, an extended server hello message includes a CAPTCHA extension field. The CAPTCHA extension field can include approximately $2^{16}$ bytes of information, which is sufficient for holding a wide variety of audio, video, or image CAPTCHA information. If more than $2^{16}$ bytes of CAPTCHA information is to be transmitted, the CAPTCHA information can be transmitted using multiple extension records, transmitted over an out-of-band connection, or transmitted via data records over the TLS connection. In some embodiments, the CAPTCHA is provided to the client in the form of a reference such as a Uniform Resource Identifier ("URI") or network file path that identifies where the CAPTCHA may be obtained. When the client receives the reference to the CAPTCHA, the client contacts the CAPTCHA server identified by the reference and downloads the CAPTCHA information.

In order to procure the solution to the CAPTCHA, the client presents the CAPTCHA described by the CAPTCHA information to a human user via a presentation device. The CAPTCHA can take the form of a visual image, a video image, a sound, or other CAPTCHA format. The CAPTCHA may be presented at a user interface connected to the client or, in some examples, the CAPTCHA may be presented to the human user via a network connection to a mobile phone, mobile device, tablet computer, or other remote user interface.

In some implementations, the solution to the CAPTCHA provides a reference to a key seed server, and after solving the CAPTCHA, the client uses the solution to acquire the key seed value from the key seed server. The key seed value can be deleted from the key seed server when no longer needed. If an attacker stores the CAPTCHA along with the encrypted communications between the client and the server for later decryption, and the key seed value is removed from the key server before the CAPTCHA is solved by the attacker, the attacker will not be able to retrieve the key seed value even if the CAPTCHA is correctly solved. In some examples, the CAPTCHA provides an access key that is used to access the key seed value from the key seed server.

In some embodiments, broader classes of problems may be substituted for a CAPTCHA problem. For example, problems where a proposed solution to the problem is computationally less intensive to verify than the problem is to solve can be used to provide a key seed value to the client. A computationally less intensive problem is a problem (e.g., verifying a solution to a first problem) that, for a particular computer system, consumes less time to solve than a related problem (e.g., the first problem itself). The difference in solution time may be based at least in part on a lower number of processor cycles being necessary to solve the problem, lower memory use while solving the problem, or less network bandwidth use while solving the problem. In Big O notation, the difficulty of solving the problem can be represented as $O_{Solve}(f)$ and the difficulty of verifying a proposed solution to the problem can be represented as $O_{Verify}(g)$. When f is asymptotically greater than g, the problem may be suitable for transmitting a key seed value. For example, problems based at least in part on factoring numbers, cryptographic hashes, discrete exponential and logarithms, modular squaring, and elliptic curves. A CAPTCHA is an example of a problem that is typically computationally less intensive to verify than solve. In some examples, a CAPTCHA is easily answered by a human being with no advance knowledge of the character sequence while being substantially difficult to answer by an automated agent unaided by a second human being. A CAPTCHA that is easily solved by a human being may be solved in as little as a few seconds, or up to a minute. Whereas the same CAPTCHA may not be solvable by an automated machine in any amount of time.

In some examples, a proof-of-work problem is used in the handshake in addition to or as a replacement for the CAPTCHA. In some implementations, a one-way function such as a discrete logarithm problem is generated by the online service. The one-way function is designed using generators that ensure that the client can solve the problem, but expends on average, a predetermined amount of work. For normal authorized use, the work is distributed across a large number of clients, and imposes a relatively small burden on each client. If an attacker attempts to mount a widespread automated attack by impersonating an online service, the attacker must perform the proof-of-work problem for all intercepted connections, thereby imposing a substantial computational burden on the decoy service.

In some embodiments, a CAPTCHA may be provided by both parties to the secure network connection. In one example, a messaging application operates over a secure connection and the identities of the parties are verified using digital certificates. During the handshake establishing the secure network connection, each party sends a CAPTCHA to the other that is solved to acquire information used to generate a master secret key that is used to secure the connection. If an attacker attempts to implement an automated man-in-the-middle attack, human resources must be expended to solve the CAPTCHAs, or the secure network connection will fail.

The information exchanged using the CAPTCHAs may be retained and reused for establishing multiple secure connections for an amount of time before the information expires. A human user is not bothered to solve the CAPTCHA for each and every connection to the online service. Repeated connections to the online service may reuse previously exchanged information from a CAPTCHA previously solved by the human user. If the information expires, a new CAPTCHA is generated and presented by the online service to the human user. The online service can control the frequency with which the information expires. For example, information may expire every 10 minutes, hourly, or daily. In another example, the CAPTCHA problems provided by the online service include a secure reference identifier. The reference identifier and the solution to the CAPTCHA are stored in cache by the client when the CAPTCHA is solved by the human user. The online service can reuse previously solved CAPTCHAs, which can be identified by the client using the reference identifier. When a previously solved CAPTCHA is used, the client retrieves the stored solution without presenting the CAPTCHA to the human user.

Secure connections may be reused using non-locally cached data. A client device can request secure communication with a proxy system (e.g., the online proxy fleet ("OPF")). The proxy system determines whether the local cache includes a session state identifier associated with the client's request. If the local cache does not include the session state identifier, it determines whether another cache within a shared cache system stores the session state identifier from a previous session. The proxy system then establishes a secure connection with the client device based at least in part on the stored session state identifier. This helps avoid having to renegotiate the secret used to establish a secure TLS/SSL session each time a client talks to a new server in the OPF. Additional information is described in U.S. Pat. No. 9,064,124 which is incorporated herein by reference.

FIG. 1 shows an illustrative example of an environment in which various embodiments may be practiced. A diagram 100 shows an environment in which a client computer system 102 attempts to communicate with a server 104, but a man-in-the-middle attacker successfully intercepts the connection between the client computer system 102 and the server 104. The server 104 can be a single computer system, or a group of computer systems coordinated to provide a service. The man-in-the-middle attacker deploys a decoy server 106 that is configured to intercept communications between the client computer system 102 and the server 104. The man-in-the-middle attacker uses a forged digital certificate that may be obtained from a compromised certificate authority 108. The forged digital certificate contains identity information corresponding to the server 104. The client computer system 102 is configured to trust certificates issued by the compromised certificate authority 108, and therefore believes the identity information provided by the man-in-the-middle attacker in the forged certificate. The client computer system 102, having validated the forged digital certificate using the public key of the compromised certificate authority 108, establishes a first TLS connection 110 to the decoy server 106, believing that the decoy server 106 is the server 104. The decoy server 106 establishes a second TLS connection 112 to the server 104.

In the environment shown in the diagram 100, the man-in-the-middle is able to view information communicated between the client computer system 102 and the server 104 in plaintext form because the decoy server 106 is able to access the encryption keys associated with the first TLS connection 110 and the second TLS connection 112. For example, if the client computer system 102 sends a request to the decoy server 106, believing that the decoy server 106 is the server 104, the decoy server 106 is able to access the session keys associated with the first TLS connection 110, and is able to decrypt the client's request. The client's request is relayed by the decoy server 106 to the server 104 via the second TLS connection 112. The server 104, believing that the decoy server 106 is the client computer system 102, returns a response that the decoy server 106 can decrypt using the session keys associated with the second TLS connection 112. The response can be relayed by the decoy server 106 to the client computer system 102, and in many situations, the client computer system 102 will be unaware that the man-in-the-middle attacker has intercepted and decoded the message.

If a man-in-the-middle attacker is able to create an effective decoy server through the use of forged certificates, stolen certificates, or by compromising the security of a service to be impersonated, a large scale mass attack may be launched that directs large amount of traffic to the decoy server. Automated phishing attacks, combined with automated scripts that relay communications between a client and a server, allow the man-in-the-middle attacker to scale up an attack and compromise large numbers of connections and large amounts of information.

Figure 2:
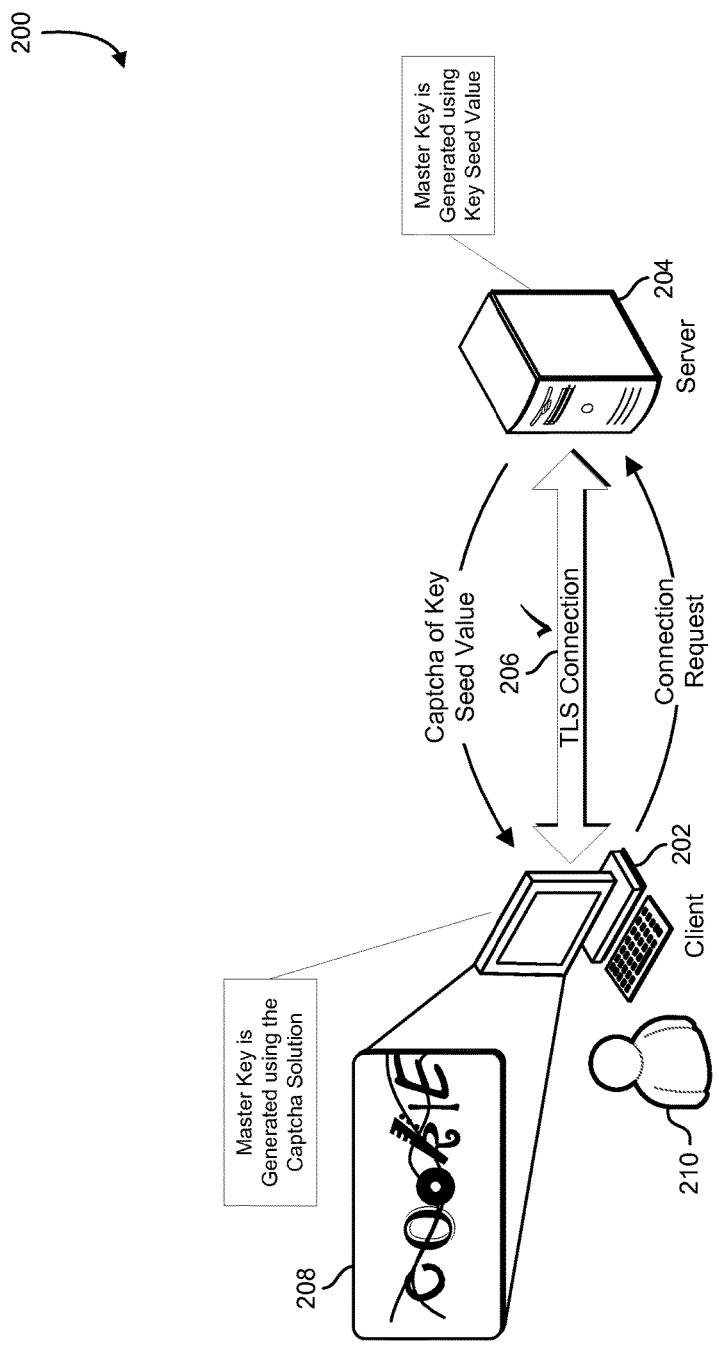
FIG. 2 shows an illustrative example of a system that establishes a secure connection between a client and a server using a handshake that incorporates a Completely Automated Public Turing test to tell Computers and Humans Apart ("CAPTCHA"), in accordance with an embodiment.

FIG. 2 shows an illustrative example of a system that establishes a secure connection between a client and a server using a handshake that incorporates a CAPTCHA, in accordance with an embodiment. A diagram 200 shows a client computer system 202 and a server 204 that communicate over a TLS connection 206. In some examples, the TLS connection is in accordance with TLS version 1.2, or other versions that are compatible with version 1.2. The TLS connection is established using an extended handshake that includes a CAPTCHA 208 which is provided by the server 204 to the client computer system 202. The CAPTCHA 208 is presented by the client computer system 202 to a human user 210 using a user interface connected to the client computer system 202.

The CAPTCHA 208 is used during the negotiation of the TLS connection 206 to acquire a cryptographic key which is used to encrypt communications between the client computer system 202 and the server 204 over the TLS connection 206. In some examples, the client computer system 202 initiates a secure connection to the server 204. The server 204 provides a digital certificate to the client computer system 202 along with a random seed value. The client computer system 202 validates the digital certificate as belonging to the server 204. The client computer system 202 uses the random seed value and other randomly generated values to produce a pre-master secret. The pre-master secret is encrypted using the server's public key, which is obtained from the digital certificate, and sent to the server 204. The server 204 generates a key seed value to be used in combination with the pre-master secret to generate a master secret key. The key seed value is represented as a set of visible characters. The CAPTCHA 208 is generated by the server 204, the solution of which matches the set of visible characters. The server 204 transmits the CAPTCHA 208 to the client computer system 202 in an extension field of the TLS handshake. The client computer system 202 presents the CAPTCHA 208 to the human user 210. The human user 210 solves the CAPTCHA 208 by providing the set of visible characters to the client computer system 202. The client computer system 202 uses the set of visible characters to acquire the key seed value. Both the client computer system 202 and the server 204 are able to access the pre-master secret and the key seed value, and can therefore generate matching master secret keys. If the client computer system 202 is a fully automated system, or if the human user 210 does not properly solve the CAPTCHA, the client computer system 202 will not be able to generate the correct master secret key and the TLS connection 206 will fail.

In various embodiments, various types of CAPTCHA problems may be used to encode the key seed value and be provided to the client computer system 202. In some examples, an image-based CAPTCHA is used that displays a sequence of characters that are warped, distorted, or include superfluous patterns or lines configured to increase the difficulty of optical character recognition. In another example, a video-based or animation-based CAPTCHA is used that displays a sequence of characters that move, or which have moving elements that appear in front of or behind the characters. In yet another example, an audio CAPTCHA includes an audio recording of a character sequence that represents the key seed value. The audio recording can include background noise designed to interfere with automated speech recognition. Other forms of CAPTCHA may be used which convey information. If the information density of a particular CAPTCHA is low, the key provided by the CAPTCHA solution may be extended using key stretching algorithms. Key stretching algorithms such as Password-based Key Derivation Function 2 ("PBKDF2") or Scrypt may be used to derive stronger keys from the CAPTCHA contents. The derived key then can be used with a keyed-hash such as a Hash-based Message Authentication Code ("HMAC") to generate the handshake signatures. Techniques for generating CAPTCHAs are described in the following publications which are incorporated herein by reference: "An Efficient Segmentation Algorithm for CAPTCHAs with Line Cluttering and Character Warping" Multimedia Tools and Applications June 2010, Volume 48, Issue 2, pp. 267-289 by Shih-Yu Huang, Yeuan-Kuen Lee, Graeme Bell and Zhan-he Ou; "Random Handwritten CAPTCHA: Web Security with a Difference" I.J. Information Technology and Computer Science, 2012, 9, pp. 53-58 by Mukta Rao and Nipur Singh; "Design and Comparison of Advanced Color based Image CAPTCHAs" International Journal of Computer Applications (0975-8887) Volume 61, No. 15, January 2013 by Mandeep Kumar and Renu Dhir, PhD; and "IMAGINATION: A Robust Image-based CAPTCHA Generation System" MULTIMEDIA '05 Proceedings of the 13th annual ACM international conference on Multimedia pp. 331-334 by Ritendra Datta, Jia Li, and James Z. Wang.

In some implementations, a key seed value may be converted to a human readable character sequence in the form of pronounceable words, phrases, or phonetic sequences so that the key seed value can be more easily communicated by the human solving the CAPTCHA. For example, methods described in U.S. patent application Ser. No. 14/470,886 may be used to generate a human-readable character sequence from a binary key seed value. U.S. patent application Ser. No. 14/470,886 is herein incorporated by reference.

A key seed value may be encoded using techniques that allow for increased human readability and user experience when interacting with binary information generated by a computer system. In some embodiments, a dictionary of words may be used to generate a symbol table where each symbol in the table represents a binary sequence or other bits of data. For example, a dictionary may include a set of 4,000 nouns and 16 adjectives with each symbol containing one adjective and one noun. Each adjective-noun pair would then represents 16 bits of data, 12 bits of data corresponding to the 4,000 nouns and another 4 bits of data corresponding to the 16 adjectives. Given this representation a 128-bit binary sequence may be represented as a series of 8 symbols, each symbol consisting of one adjective-noun pair. Alternatively, a 32-digit hexadecimal sequence would be required to represent the same 128-bit binary sequence. Additionally, the dictionary may be populated with simple words thereby generating short easy-to-remember symbols such as 'yellow-bike,' 'green-dog,' and 'red-cow.'

This mechanism may be used in a variety of scenarios where the key seed value comprises binary or hexadecimal information, and is communicated via a human operator. For example, if the key seed value is an 8-digit decimal number, using the mechanism described above, the 8-digit decimal number may be replaced with one adjective-noun pair. Additionally, key seed values may be represented using one or more symbols generated from a dictionary of words. The set of word pairs may include 4 adjective-noun pairs representing a 64-bit time-limited unique key seed value.

In some embodiments, the dictionary may include other elements of speech such as verbs, adverbs, prepositions, pronouns and other elements of speech suitable for generating symbols representative of binary or hexadecimal sequences. Additionally, the symbols may include any number of dictionary elements, for example, a symbol may include an adjective-noun-verb set such as 'red dog run,' smart cow sleep' and 'blue whale eat.' Elements not included in the dictionary may be added to symbols in order to improve human readability. For example, a preposition may be added to increase readability but may not be included in the dictionary, for example 'the red dog runs' or 'a blue whale eats.' The preposition may be placed in a position in the symbol such that the set of words in the symbol are grammatically correct, as illustrated in the previous example. The dictionary and corresponding symbol table may be generated on a per application basis, a per users basis, a per use basis or other basis capable of differentiation. Furthermore, the dictionary and corresponding symbol table may be generated by a computing resource service provider (also referred to simply as a service provider) and offered as a service to user. For example, a user may provide a set of symbols (also referred to as a sequence of symbol) to the service provider and the service provider may convert the set of symbols to the corresponding binary sequence and provider the binary sequence to another computer system on behalf of the user. The use of the symbols described herein may increase efficiency of computer systems and reduce errors during the operation of computer systems. Other advantages may include some or all of higher data throughput, higher security, higher efficiency, fewer errors, and improved interface between humans and computer systems.

The client computer system 202 can present the CAPTCHA 208 to the human user 212 using a variety of user interfaces. The CAPTCHA 208 may be presented via a user interface that is connected to the client computer system 202, or the CAPTCHA 208 may be presented to the human user 212 via a network-connected device such as a tablet computer, mobile device, cell phone, or other network-connected computer system that includes a suitable user interface. The user interface is selected to effectively present the CAPTCHA 208. For example, a flat-panel display screen may be used to present an image-based or video-based CAPTCHA. An audio output device such as a sound card, Bluetooth speaker, or wireless headset may be used to present an audio-based CAPTCHA.

Figure 3:
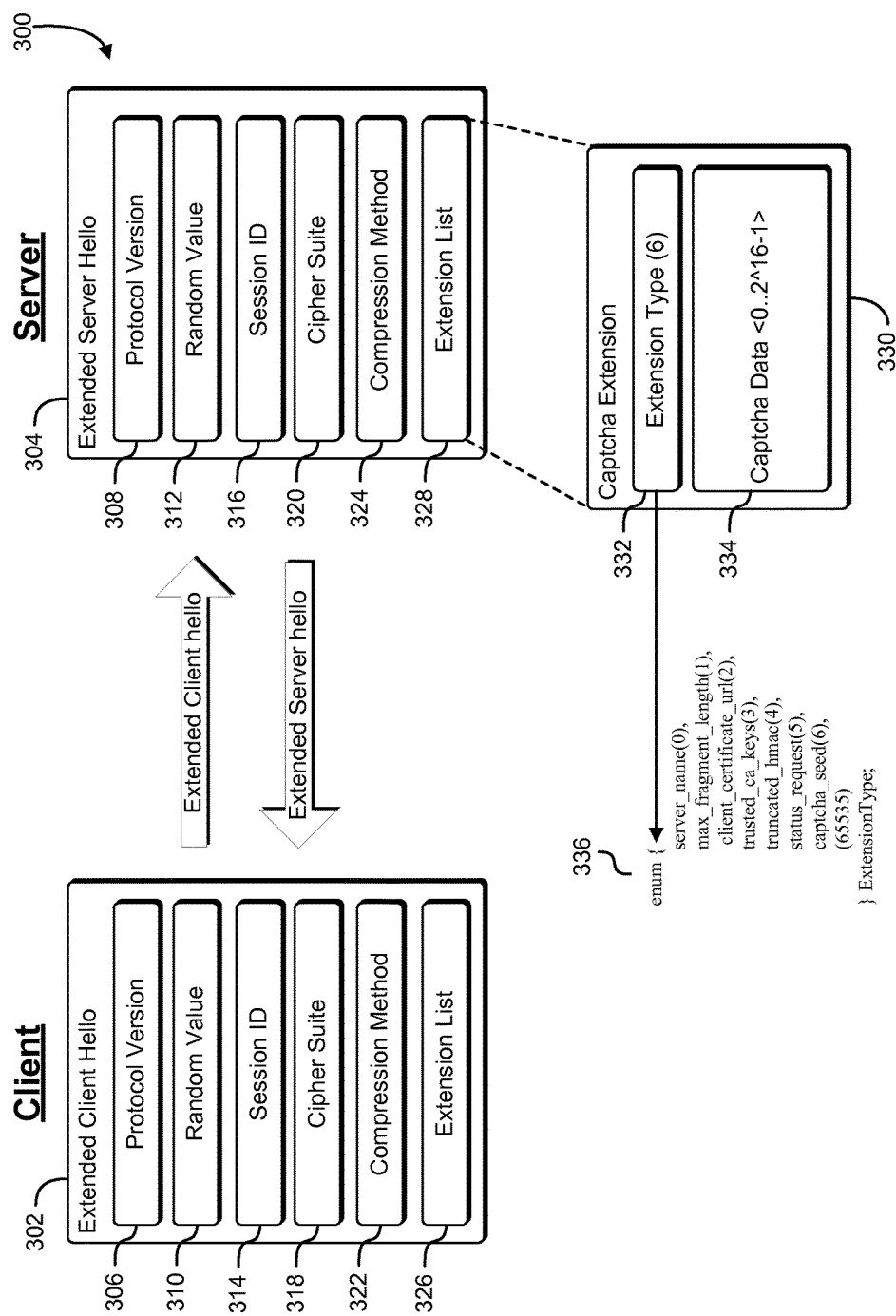
FIG. 3 shows an illustrative example of extended "Server hello" and "Client hello" messages that include an extension record that contains CAPTCHA data, in accordance with an embodiment.

FIG. 3 shows an illustrative example of extended "Server hello" and "Client hello" messages that include an extension record that contains CAPTCHA data, in accordance with an embodiment. A diagram 300 includes an extended "Client hello" structure 302 and an extended "Server hello" structure 304 that may be used as part of a TLS handshake to establish a connection. The extended "Client hello" structure 302 includes a client protocol version 306. The client protocol version 306 identifies the version of the TLS protocol that the client is requesting for a particular session. The extended "Server hello" structure 304 includes a server protocol version 308. The server protocol version 308 will contain the lower of the client protocol version 306, and the highest version supported by the server.

The extended "Client hello" structure 302 includes a client random value 310 that is randomly generated by the client. The extended "Server hello" structure 304 includes a server random value 312 that is independently generated from the client random value 310 by the server.

The extended "Client hello" structure 302 includes a client session ID 314 that is used by the client to specify an ID for the session. The client session ID 314 may be empty if no session ID is available, or if the client wishes to generate new security parameters. The extended "Server hello" structure 304 includes a server session ID 316. If the server receives a client session ID 314 that is not empty, the server will attempt to find a cached session having the client session ID 314. If a match is found, the server may respond with a server session ID 316 that is the same as the client session ID 314, indicating a resumed session. If the server session ID 316 is returned with a different value than the client session ID 314, a new session is indicated having the session ID specified by the server session ID 316.

The extended "Client hello" structure 302 includes a list of cipher suites 318. The list of cipher suites 318 indicates cipher suites that are supported by the client and is provided in an order sorted to indicate the preferences of the client. The extended "Server hello" structure 304 includes a server cipher suite 320. The server cipher suite 320 is a single cipher suite, selected from the list of cipher suites 318 provided by the client, and supported by the server. If a session is resumed, the server cipher suite 320 will indicate the cipher suite from the resumed session state.

The extended "Client hello" structure 302 includes a list of compression methods 322. The list of compression methods 322 is provided by the client in a sorted order that indicates the preferences of the client. The extended "Server hello" structure 304 includes a compression method 324, selected from the list of compression methods 322, and supported by the server. If the session is resumed, the compression method 324 is the compression method used for the resumed session.

A client may offer one or more extensions as part of the TLS hello exchange. The extended "client hello" structure 302 includes a client extension list 326. The client extension list 326 indicates a set of TLS extensions supported by the client. The extended "Server hello" structure 304 includes a server extension list 328. The server extension list 328 specifies extensions that are supported by the client, and that the server is willing to support. In many TLS implementations, the server may not include extensions in the server extension list 328 that are not first specified in the client extension list 326. Server-initiated extensions may be supported, provided that the client first indicates that the extension type is supported in the client extension list 326. For example, a client may send an extended client hello, with an extension list that includes an extension of type X with an empty extension data field, to indicate to the server that extensions of type X are supported. The server may respond with an extended "Server hello" that includes an extension list with an extension of type X. If the client receives an extended "Server hello" containing an extension that was not present in the corresponding extended "Client hello," the client may terminate the connection.

Diagram 300 includes an illustrative example of an extension record for use with an extended "Server hello" message that provides a CAPTCHA to the client, in accordance with an embodiment. An extension 330 suitable for use with an extended TLS "Server hello" message includes an extension type 332 and CAPTCHA data 334. The extension type 332 is an enumeration that specifies the type of the extension. An example extension type definition showing various types of extensions is shown in a code fragment 336. The code fragment 336 defines seven types of extensions: a server name extension, a max fragment length extension, a client certificate URL extension, a trusted CA keys extension, a truncated HMAC extension, a status request extension, and a CAPTCHA seed extension. Additional types of extensions can be defined by modifying the provided code fragment. Various types of extensions utilize the CAPTCHA data 334 in different ways depending on the needs of the extension, and each particular extension may define a different structure for the information contained in the CAPTCHA data 334. In various examples, the CAPTCHA data 334 includes a CAPTCHA in the form of an image. The image may be represented as a bitmap, or in a standard image format such as GIF, PNG, IMG, JPEG, TIFF, BMP, or raster format. If the CAPTCHA is an audio-based CAPTCHA, the CAPTCHA data 334 may be in the form of uncompressed audio, or in a standard audio format such as MP3, WAV, AU, PCM, MPEG-4, or other format. Video-based CAPTCHAs may be encoded as an animated GIF, AVI, Flash, VOB, M4V, MPEG-1, MPEG-2, or other video or animation format. In some implementations, the CAPTCHA data 334 can take the form of executable code that, when executed by the receiving client, produces the audio, video, or image of the CAPTCHA. The executable code can take the form of a script such as JavaScript, Python, or Perl or a compiled language such as C++, C#, Java, or Basic. In some embodiments, the CAPTCHA data 334 takes the form of a reference to a remote file location or service that hosts the CAPTCHA information.

In various examples, the client does not send a reply to the CAPTCHA provided by the service because, in some situations, the reply can be used to provide an automated response to the CAPTCHA. For example, the client does not return an answer to the CAPTCHA to the server because if the answer is intercepted by a man-in-the-middle attacker, the attacker may use the intercepted return value to provide an automated response to the CAPTCHA.

Figure 4:
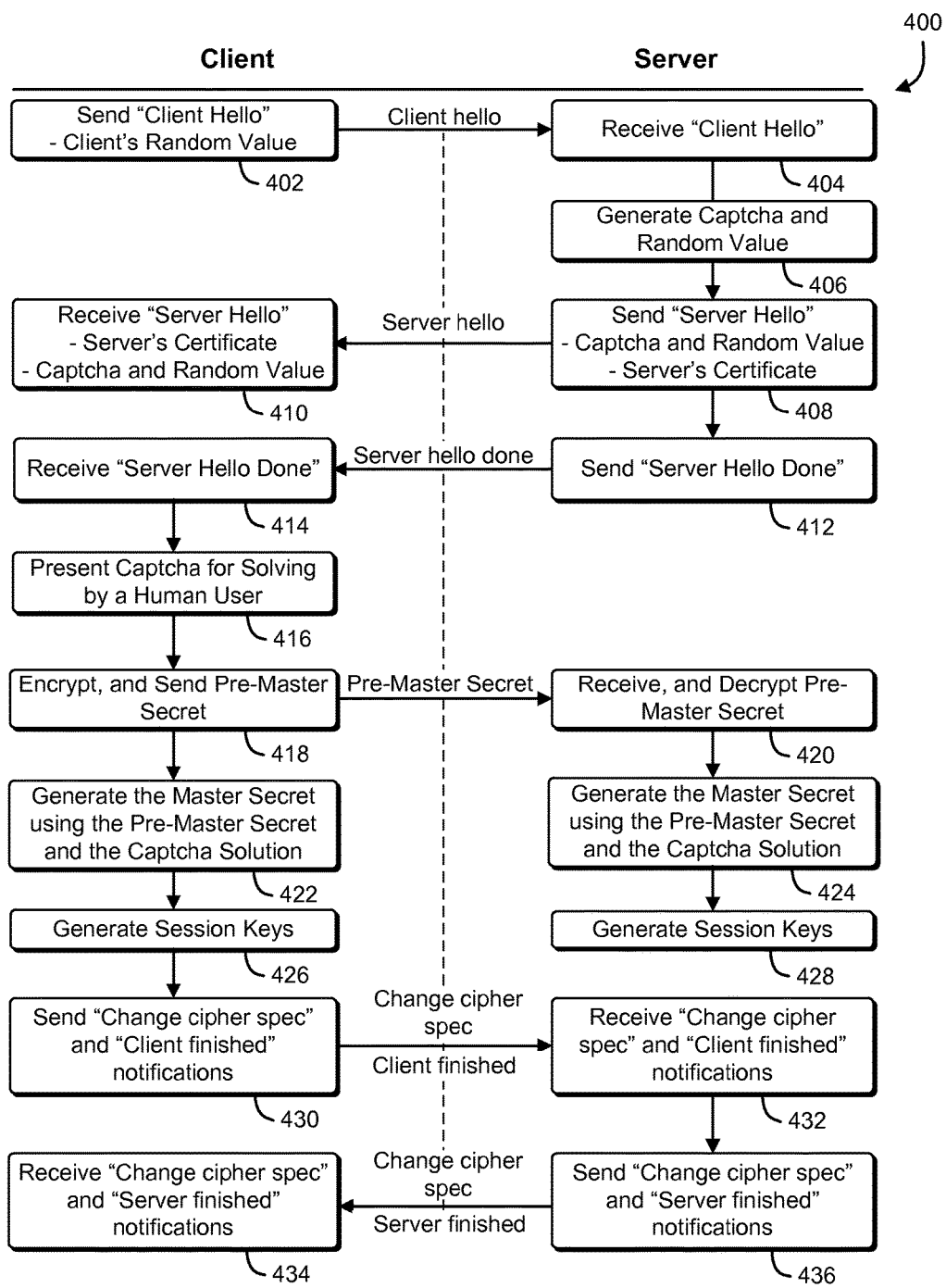
FIG. 4 shows an illustrative example of a process that, when performed by a client and a service, establishes a TLS connection using a handshake that includes a CAPTCHA, in accordance with an embodiment.

FIG. 4 shows an illustrative example of a process that, when performed by a client and a service, establishes a TLS connection using a handshake that includes a CAPTCHA, in accordance with an embodiment. A swim diagram 400 illustrates a TLS handshake process that begins at block 402. At block 402, the client sends a "Client hello" message to the server. The "Client hello" message includes a random value that is generated by the client. The server receives 404 the "Client hello" message and the random value from the client. At block 406, the server generates a second random value, a key seed value, and a CAPTCHA that, when solved, produces the key seed value. At block 408, the server sends a "Server hello" message to the client that includes the server's digital certificate, the CAPTCHA, and the second random value generated by the server. The client receives 410 the "Server hello" message from the server along with the server's certificate, the second random value, and the CAPTCHA. The client validates the identity of the server using the server's provided certificate.

At block 412, the server sends a "Server hello done" message to the client. The client receives 414 the "Server hello done" message, and proceeds to block 416 where the client presents the CAPTCHA received from the server to a human user, and the human provides the solution. Using the CAPTCHA solution, the client acquires the key seed value. At block 418, the client generates, encrypts and sends a pre-master secret to the server. In some implementations, the pre-master secret may be based at least in part on the random values exchanged above. The pre-master secret is encoded with the public key of the server and transmitted to the server. At block 420, the server receives and decrypts the pre-master secret using the server's private key. Using the pre-master secret and the key seed value derived from the CAPTCHA solution, the client generates a master secret at block 422. At block 424, the server generates a matching master secret using the pre-master secret and the key seed value. At block 426, the client generates session keys for the secure session, and the block 428, the server generates session keys for the secure session. The client signals 430 that client will be switching to a secure cipher by sending a "change cipher spec" message to the server, followed by a "client finished" message. The server receives the "change cipher spec" message and the "client finished" message at block 432. At block 434, the server responds with its own "change cipher spec" message followed by a "server finished" message. The client receives the "change cipher spec" and the "server finished" message at block 436.

Once the process illustrated in the swim diagram 400 is completed, the secure session has been negotiated between the client and server. The client and the server can continue to transmit application data, secured by the negotiated cipher suite, using a record protocol. If the CAPTCHA is not successfully solved by the human user, or if the CAPTCHA is incorrectly solved by an automated process, or if no attempt is made to solve the CAPTCHA, the master secret generated by the client will be incorrect and will not match the master secret generated by the server, which is generated using the correct key seed value. If the master secret determined by the client does not match the master secret determined by the server, the connection will fail. If the CAPTCHA is successfully and correctly solved by the human user, the solution of the CAPTCHA provides the key seed value to the client, allowing the client to compute a master secret that matches the master secret determined by the server. In a large scale automated man-in-the-middle attack, an attacker attempts to intercept a large number of connections from clients by substituting a decoy service. By inserting a CAPTCHA into the handshake that establishes the connection between the legitimate service and the client, the number of connections that can be attacked may be limited by the manpower required to solve the CAPTCHA for each connection.

Figure 5:
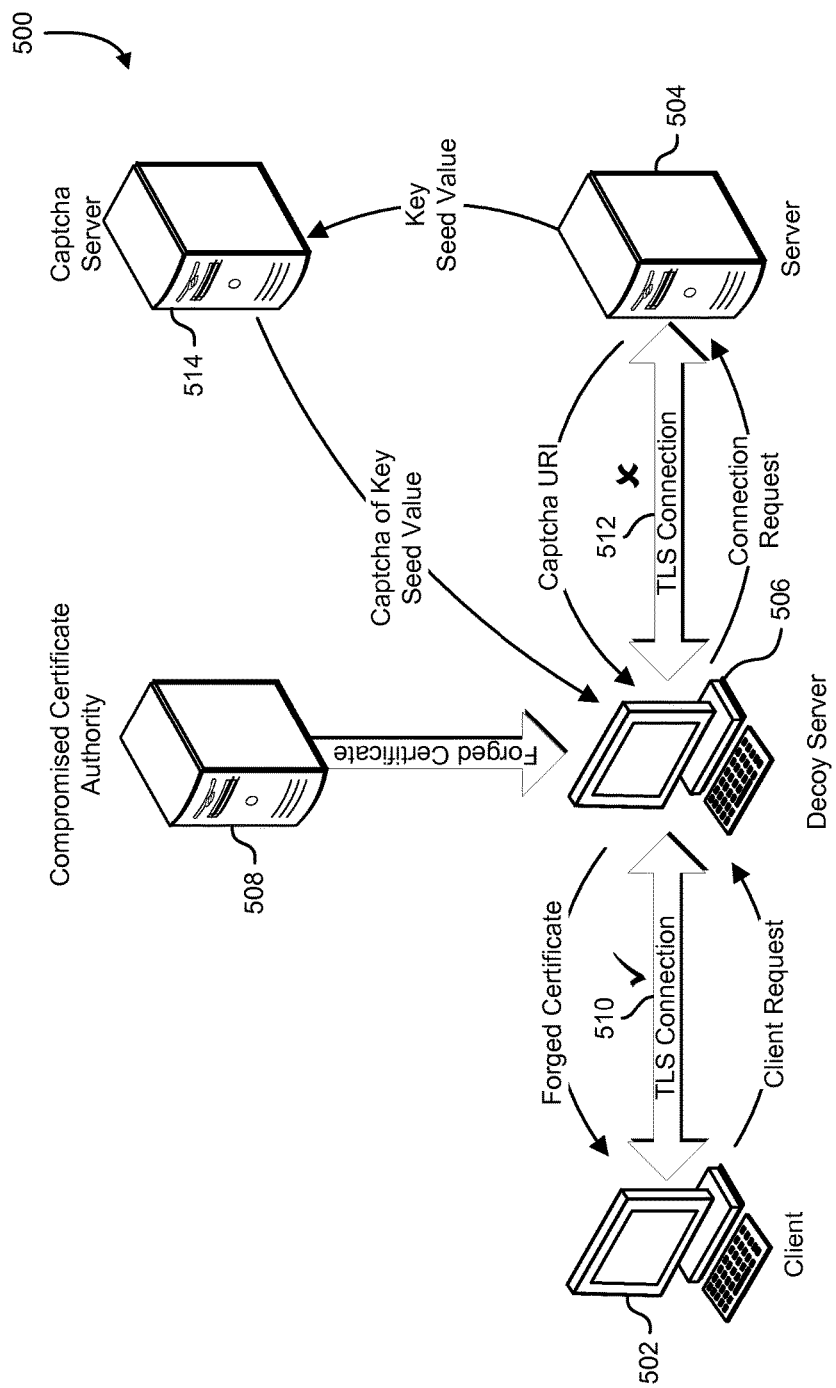
FIG. 5 shows an illustrative example of a system using a handshake that incorporates a CAPTCHA to defeat a man-in-the-middle attack, in accordance with an embodiment.

FIG. 5 shows an illustrative example of a system using a handshake that incorporates a CAPTCHA to defeat a man-in-the-middle attack, in accordance with an embodiment. A diagram 500 includes a client computer system 502 that attempts to communicate with a server 504. A decoy server 506 is deployed by an attacker using a forged certificate obtained from a compromised certificate authority 508. The compromised certificate authority 508 is trusted by the client computer system 502. Compromised certificate authorities may sometimes be trusted by a client computer system when a privileged user imports certificates for certificate authorities that have not been properly vetted, or when old certificates are not properly removed from the client computer system. As a result of the client computer system 502 trusting the compromised certificate authority 508, the client computer system 502 receives the forged certificate, and validates the forged certificate using the public key of the compromised certificate authority. The client computer system 502 connects to the decoy server 506 via a first TLS connection 510.

The decoy server 506 attempts to connect to the server 504 and relay requests and information from the server 504 to the client computer system 502. The decoy server 506 initiates a second TLS connection 512 to the server 504. In some examples, the decoy server 506 provides a CAPTCHA to the decoy server 506 by embedding the CAPTCHA information in an extended TLS "Server hello" message. In another example, the decoy server 506 provides a reference to a CAPTCHA in the extended TLS "Server hello" message. The reference can take the form of a network file path, a network file identifier, a URL, a URI, or other identifier. In the diagram 500, the server 504 generates a key seed value and provides the key seed value to a CAPTCHA server 514 via a secure connection. The CAPTCHA server 514 generates a CAPTCHA problem having a solution that matches the key seed value. The CAPTCHA server 514 provides a CAPTCHA URI to the decoy server 506 in the extended TLS "Server hello" message. The decoy server 506 receives the CAPTCHA URI and contacts the CAPTCHA server 514. The CAPTCHA server 514 provides the CAPTCHA problem to the decoy server 506. If the decoy server 506 is unable to acquire the solution to the CAPTCHA problem, the decoy server 506 will be unable to acquire the key seed value used in part to generate the master secret and therefore the second TLS connection 512 will fail. If the second TLS connection 512 fails, the decoy server 506 will be unable to relay responses to client requests, making the attack less convincing and more likely to fail. If the decoy server 506 attempts to acquire a solution to the CAPTCHA, substantial human resources may be expended if a large number of connections are attacked.

Figure 6:
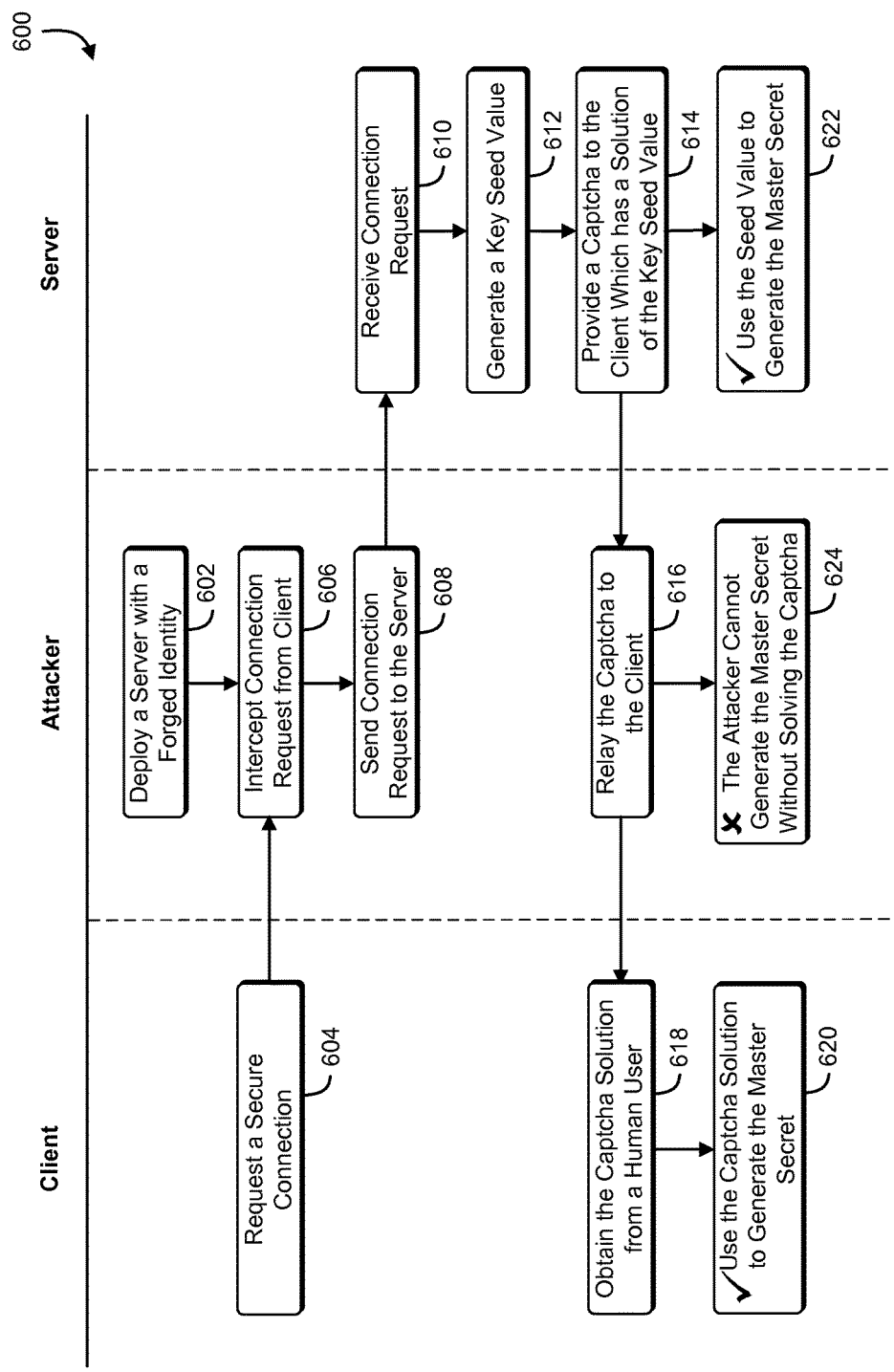
FIG. 6 shows an illustrative example of a process that, when performed by a client, a service, and an automated attacker, defeats a man-in-the-middle attack by the automated attacker by negotiating a master key based at least in part on a CAPTCHA that identifies a key seed value, in accordance with an embodiment.

FIG. 6 shows an illustrative example of a process that, when performed by a client, a service, and an automated attacker, defeats a man-in-the-middle attack by the automated attacker by negotiating a master key based at least in part on a CAPTCHA that identifies a key seed value, in accordance with an embodiment. A swim diagram 600 shows a process that begins at block 602 where an attacker deploys a decoy server using a forged identity. The forged identity may be created using a forged digital certificate, a stolen digital certificate, or a compromised cryptographic key belonging to the server.

At block 604, the client attempts to create a secure connection to the server, but instead initiates a connection to the decoy server deployed by the attacker. The attacker intercepts 606 the connection request from the client, and establishes a connection between the decoy server and the client. At block 608, the attacker sends a connection request from the decoy server to the server in order to attempt to establish a man-in-the-middle attack where the attacker relays information between the client and the server and can observe communications in both directions in plaintext.

At block 610, the server receives the connection request from the decoy server. During the handshake process establishing a secure connection between the server and the decoy server, the server generates 612 a key seed value. The server generates a CAPTCHA problem having a solution that matches the key seed value. In some examples, the server generates the CAPTCHA problem by providing the key seed value to a CAPTCHA server which generates a CAPTCHA problem. In another example, the server establishes a secure connection to a CAPTCHA server, and the CAPTCHA server generates the CAPTCHA problem and the key seed value, providing the key seed value and a reference to the CAPTCHA stored on the CAPTCHA server. At block 614, the server provides the CAPTCHA to the decoy server. The CAPTCHA may be provided to the decoy server using an extended "Server hello" message as part of a TLS handshake. In some examples, information that describes this CAPTCHA problem is included in the handshake, and in other examples, a reference to the CAPTCHA problem is included in the handshake.

At block 616, the attacker receives the CAPTCHA from the server at the decoy server. If the attacker does not solve the CAPTCHA, the attacker cannot obtain the key seed value. At block 622, the server uses the key seed value to generate a master secret which is used to encrypt communications with the server. If the attacker does not solve the CAPTCHA, the decoy server does not have the key seed value which is used to generate the master secret, and therefore the attacker cannot decrypt communications from the server. In some examples, the decoy server may relay the CAPTCHA problem to the client in an attempt to obtain a solution. If the client receives a CAPTCHA, the client can obtain 618 the CAPTCHA solution from a human user, but does not need to respond with a solution. At block 620, the client, using the CAPTCHA solution, can generate a master secret that matches the master secret generated by the server at block 622. Without solving the CAPTCHA, the decoy server cannot view the communications between the client and the server in plaintext form, and in many situations, connections between the server, the decoy server, and the client will fail.

Figure 7:
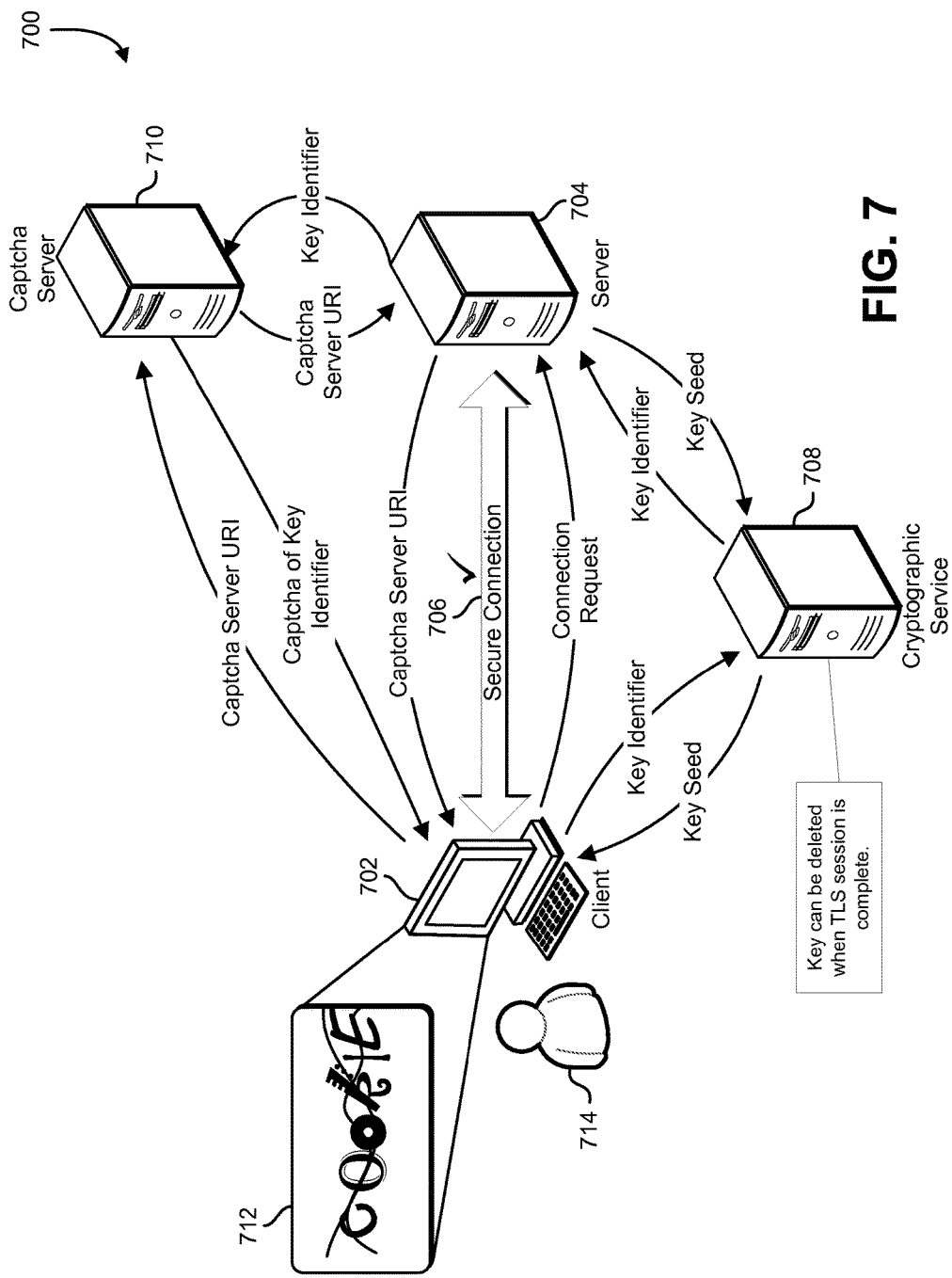
FIG. 7 shows an illustrative example of a system that establishes a secure connection between a client and a server by encrypting the communications using a key that is identified by a CAPTCHA solution and maintained by a cryptographic service, in accordance with an embodiment.

FIG. 7 shows an illustrative example of a system that establishes a secure connection between a client and a server by encrypting the communications using a key that is identified by a CAPTCHA solution and maintained by a cryptographic service, in accordance with an embodiment. A diagram 700 shows a client computer system 702 communicating to a server 704 over a secure connection 706. The secure connection 706 can be a TLS connection, an SSL connection, a VPN network connection, or an Internet protocol security ("IPSec") connection. The client computer system 702 initiates the secure connection to the server 704.

As a result of receiving the connection request, the server 704 generates a key seed value. The server 704 sends the key seed value to a cryptographic service 708. In various examples, communications between the server 704 the cryptographic service 708 occur over a secure communication channel such as a TLS connection. The cryptographic service 708 stores the key seed value and returns a key identifier to the server 704. The key identifier may be used to recover the key seed value from the cryptographic service 708. The server 704 provides the key identifier to the CAPTCHA server 710. The CAPTCHA server generates a CAPTCHA problem that, when solved, produces the key identifier. In one example, if the key identifier has a value of "YH43GNB", then the CAPTCHA server 710 produces a CAPTCHA with a solution of "YH43GNB". The CAPTCHA server 710 provides a CAPTCHA server URI to the server 704. In some examples, the CAPTCHA server 710 responds with a URL, network file path, or other reference to a location storing CAPTCHA information. In various examples, communications between the server 704 and the CAPTCHA server 710 occur over a secure connection such as a TLS connection. The CAPTCHA server URI may be used to retrieve the CAPTCHA from the CAPTCHA server 710. In response to the connection request from the client computer system 702, the server 704 provides the CAPTCHA server URI to the client computer system 702.

As a result of receiving the CAPTCHA server URI, the client computer system 702 retrieves the CAPTCHA problem from the CAPTCHA server 710 by providing the CAPTCHA server URI to the CAPTCHA server 710. The CAPTCHA server 710 returns the CAPTCHA problem to the client computer system 702. The client computer system 702 displays a CAPTCHA image 712 that is based on the CAPTCHA problem to a human user 714 using a user interface connected to the client computer system 702. In various implementations, the CAPTCHA problem may be an audio-based CAPTCHA, a video-based CAPTCHA, and animation-based CAPTCHA, or an image-based CAPTCHA. The CAPTCHA problem may be presented to the human user 714 using a user interface adapted to present the particular type of CAPTCHA provided by the server 704. The user interface may be connected directly to the client computer system 702, or the user interface may be indirectly connected to the client computer system 702 via a computer network or a wireless connection.

The human user 714 solves the CAPTCHA problem and provides the solution to the client computer system 702. The solution to the CAPTCHA problem provides the client computer system 702 with the key identifier. The client computer system 702 acquires the key seed by providing the key identifier to the cryptographic service 708. The cryptographic service 708 responds by providing the key seed value to the client computer system 702. The key seed value is used by both the client computer system 702 and the server 704 to generate a master secret which secures the communications of the secure connection 706. An automated attacker that is unable to correctly solve the CAPTCHA problem may be unable to generate a matching master secret and may be unable to successfully decrypt communications that occur over the secure connection 706.

After the key seed value is retrieved by the client computer system 702, the cryptographic service 708 can delete the key seed value rendering the key seed value irretrievable by an attacker or other party. In one example, the client computer system 702 causes the key seed value to be rendered unavailable as a result of terminating the secure connection 706. In another example, the client computer system 702 causes the key seed value to be unavailable as a result of retrieving the key seed value from the cryptographic service 708. In some environments, an attacker may attempt to capture all communications between the client computer system 702 and the server 704. In such environments, the attacker may attempt to pass the CAPTCHA from the server 704 to the client computer system 702, and store the CAPTCHA along with the encrypted communications for later solving and decryption. However, such an attack may be foiled when a cryptographic service is used because the key used to decrypt the encrypted communications is deleted from the cryptographic service 708 once the client computer system 702 retrieves the key seed from the cryptographic service 708. An attacker that solves the CAPTCHA at a later time will obtain the key identifier, but cannot obtain the key seed from the cryptographic service 708 after the key seed has been deleted.

Various implementations can increase the difficulty of maintaining mass surveillance over a large number of human users and client computer systems. In some examples, an attacker has to solve a CAPTCHA problem in real time, before the associated key seed values are deleted from the cryptographic services that maintain them. In other examples, the key seed values are removed from the cryptographic service upon first access, and if the client computer system provides the key identifier before the attacker, the key seed value will be deleted and the attacker will be unable to acquire the key seed value. If the attacker provides the key identifier before the client computer system 702, the key seed value will be deleted and the client computer system 702 will be unable to acquire the key seed value. If the client computer system 702 is unable to acquire the key seed value, the attack may be detected and the secure connection 706 may fail.

Figure 8:
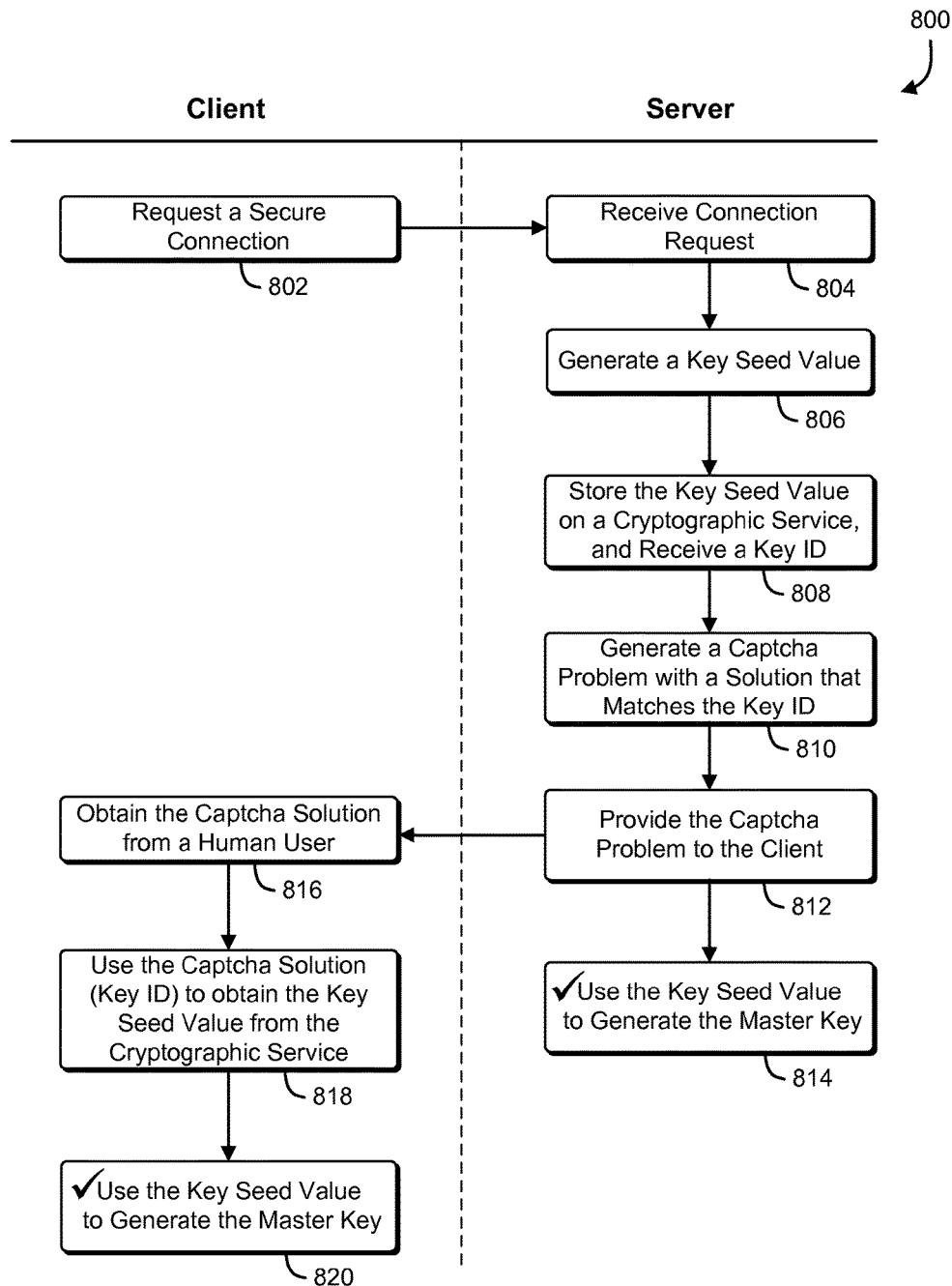
FIG. 8 shows an illustrative example of a process that, when performed by a client and a server, negotiates a master key based at least in part on a key seed value stored with a cryptographic service, in accordance with an embodiment.

FIG. 8 shows an illustrative example of a process that, when performed by a client and a server, negotiates a master key based at least in part on a key seed value stored with a cryptographic service, in accordance with an embodiment. A swim diagram 800 illustrates a process that begins at block 802 with the client requesting a secure connection to the server. The server receives 804 the connection request, and as a result of receiving the connection request generates 806 a key seed value. The key seed value can be a cryptographic key or a partial cryptographic key that can be combined with a shared secret to produce the cryptographic key. At block 808, the server stores the key seed value and a cryptographic service and receives a key ID from the cryptographic service that is usable to retrieve the key seed value. At block 810, the server causes a CAPTCHA problem to be generated, the CAPTCHA problem having a solution that matches the key ID. In some examples, the CAPTCHA problem is generated by the server. In another example, the CAPTCHA problem is generated by a remote service. At block 812, the server provides the CAPTCHA problem to the client. The server can provide the CAPTCHA problem to the client as part of a handshake process that establishes the secure connection, via a separate logical connection between the client and the server, or using a third-party CAPTCHA server. At block 814, the server uses the key seed value to generate a master key. In some examples, the key seed value is used in addition to a pre-master secret to generate the master key.

At block 816, the client receives the CAPTCHA problem from the server and presents the CAPTCHA to a human user. The human user solves the CAPTCHA and provides a CAPTCHA solution to the client. The client uses the CAPTCHA solution to obtain the key ID, and then obtains 818 the key seed value from the cryptographic service using the obtained key ID. At block 820, the client uses the key seed value to generate the master key. As described above, in some examples, the key seed value is used in addition to a pre-master secret to generate the master key. The key seed value obtained by the client via the CAPTCHA solution matches the key seed value generated by the server, and therefore the client and the server are able to generate matching master keys. In some embodiments, the client causes the cryptographic service to delete the key seed value once the key seed value is retrieved by the client.

The matching master keys generated by the client and the server can be used for secure communications between the client and server. In some examples, the master keys are used to drive a sequence of shared keys that are used to encrypt communications between the client and server. In another example, the master keys are used to provide an additional layer of encryption for data transmitted between the client and the server. In yet another example, the master keys are combined with other shared secret information to produce a second shared master key.

Figure 9:
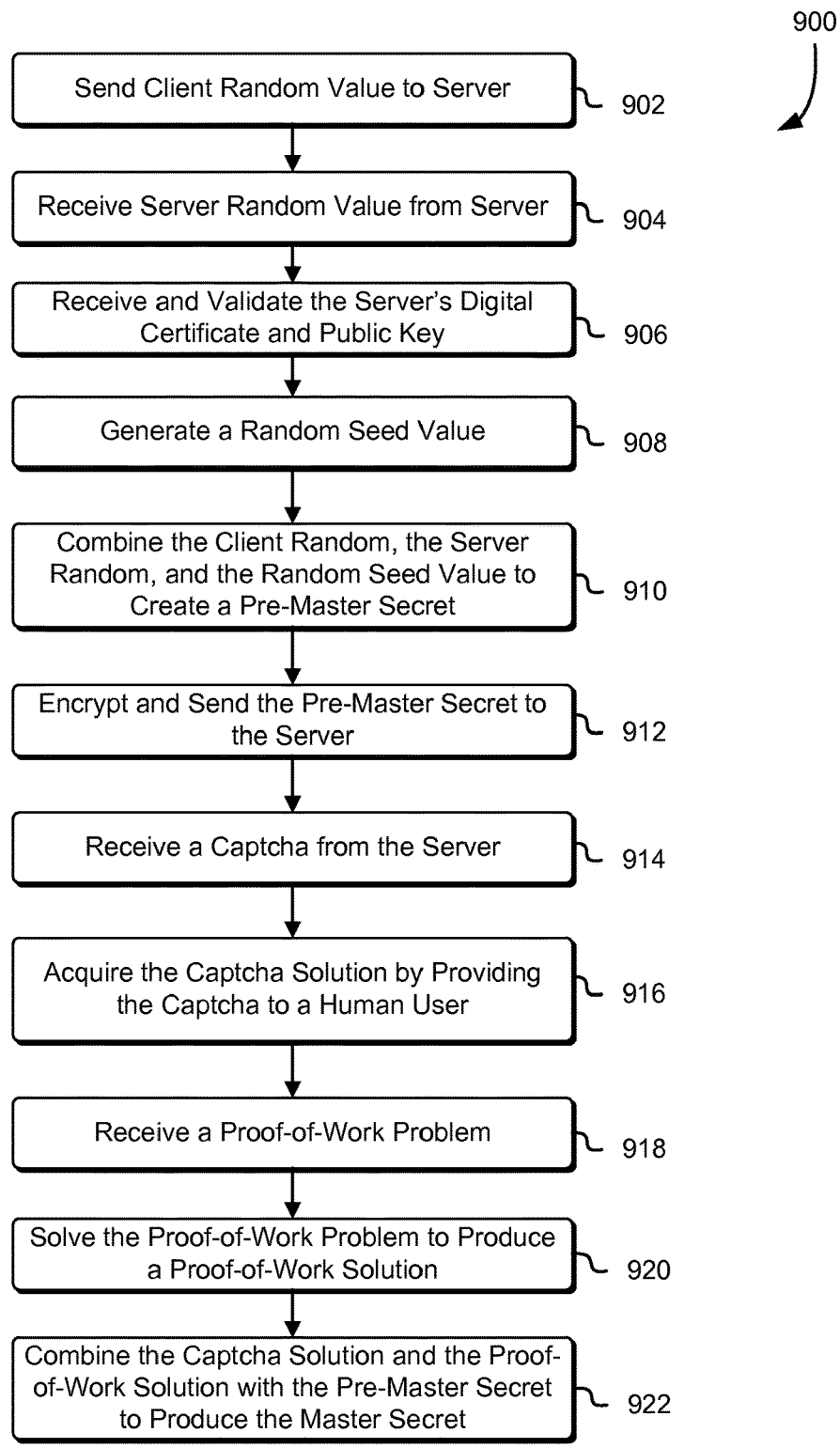
FIG. 9 shows an illustrative example of a process that, when performed by a client, determines a master secret based at least in part on a CAPTCHA and a proof-of-work problem received from a server, in accordance with an embodiment.

FIG. 9 shows an illustrative example of a process that, when performed by a client, determines a master secret based at least in part on a CAPTCHA and a proof-of-work problem received from a server, in accordance with an embodiment. A diagram 900 shows a process for determining a master secret that begins at block 902 with a client sending a randomly generated value to a server. At block 904, the client receives a randomly generated value from the server. The randomly generated values may be used as seed values for generating random cryptographic keys. The client receives 906 a digital certificate from the server, and a public key that is associated with the server. At block 908, the client generates a random seed value. The client combines 910 the randomly generated values from the client and the server with the random seed value to produce a pre-master secret. The client encrypts the pre-master secret using the public key of the server, and sends 912 the encrypted pre-master secret to the server. At block 914, the client receives a CAPTCHA problem from the server. The client provides 916 the CAPTCHA problem to a human user and acquires a solution to the CAPTCHA problem.

In some embodiments, the server may provide a proof-of-work problem to the client. At block 918, the client receives a proof-of-work problem from the server. The client solves 920 the proof-of-work problem to produce a proof-of-work solution. In one example, the server produces a discrete logarithm problem using parameters that may be solved using brute force in a predetermined amount of time. The solution to the proof-of-work problem is generated first, and the server can efficiently generate the problem. Since the solution to the proof-of-work problem is used generate the master secret, the proof-of-work problem must be solved before a secure connection between a client and the server can be established. A large-scale man-in-the-middle attack may cause a decoy server to solve a large number of proof-of-work problems, and may therefore limit the scale of the attack.

At block 922, the CAPTCHA solution is combined with the proof-of-work solution and the pre-master secret to produce a master secret. The combination of the CAPTCHA solution, the proof-of-work solution and the pre-master secret may be accomplished by multiplying the numerical representations of the elements or by performing logical operations using the numerical representations of the elements to be combined. In one example, the elements are combined by performing a bitwise Exclusive Or ("XOR") operation using the numerical representations of the elements to be combined. In another example, the elements are combined by feeding the numerical representations of the elements into a cyclic redundancy code generator. In yet another example, elements are combined by dividing the numerical representation of the elements by a prime number and taking the remainder of the division operation.

Figure 10:
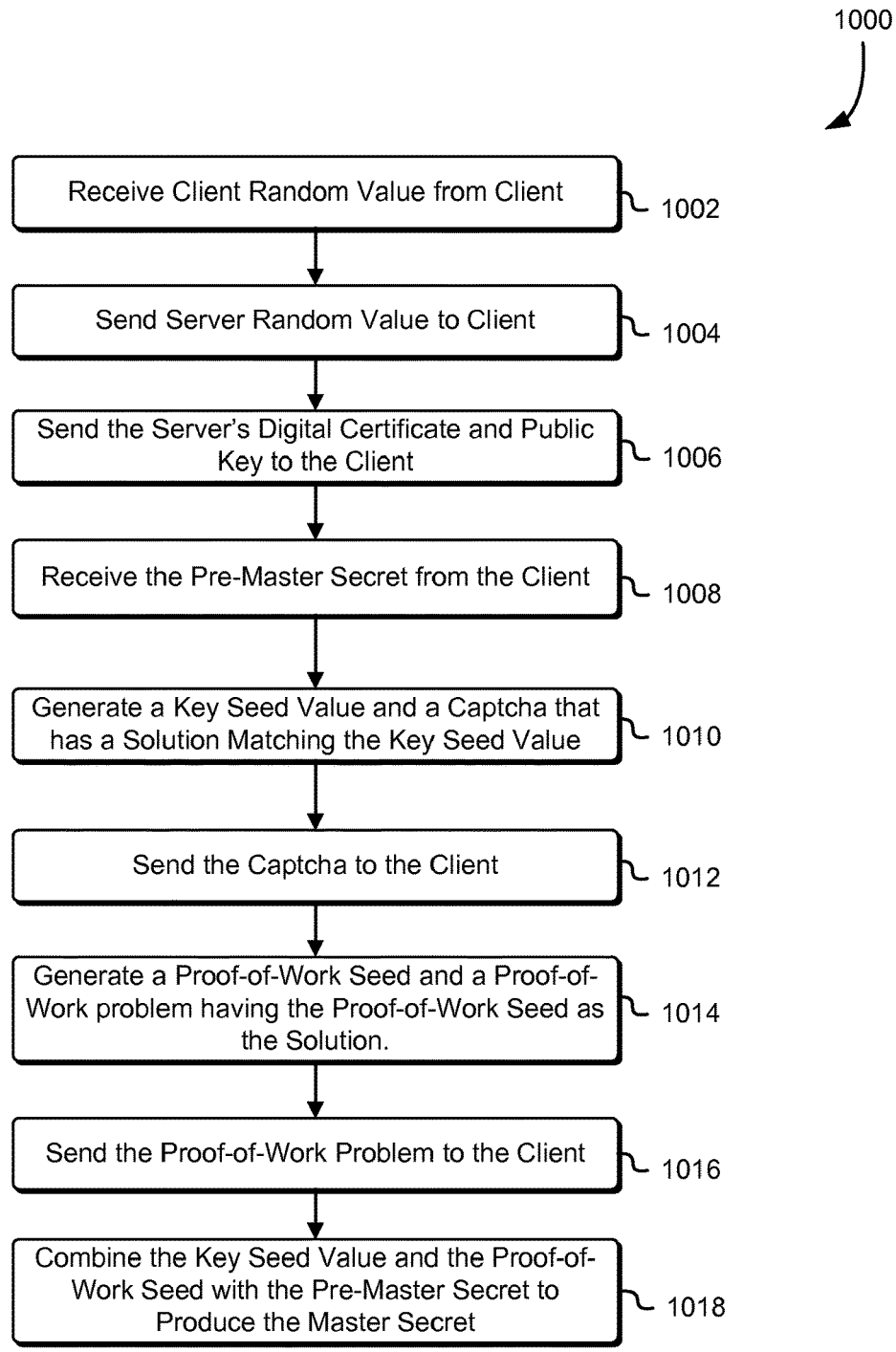
FIG. 10 shows an illustrative example of a process that, when performed by a server, determines a master secret and provides a CAPTCHA and a proof-of-work problem to a client that can be used by the client to determine a matching master secret, in accordance with an embodiment.

FIG. 10 shows an illustrative example of a process that, when performed by a server, determines a master secret and provides a CAPTCHA and a proof-of-work problem to a client that can be used by the client to determine a matching master secret, in accordance with an embodiment. A diagram 1000 shows a process for determining a master secret that begins at block 1002 with a server receiving a random value from the client. At block 1004, the server sends a random value to the client. The server sends 1006 the server's digital certificate and a public key associated with the server to the client. At block 1008, the server receives an encrypted pre-master secret from the client. The encrypted pre-master secret is decrypted using the server's private key. At block 1010, the server generates a key seed value and a CAPTCHA problem, the solution to which matches the key seed value. The server sends 1012 the CAPTCHA to the client.

In some embodiments, the client generates a proof-of-work problem that is transmitted to the client. The solution to the proof-of-work problem may be used as an additional element to generate a master secret. At block 1014, the server generates a proof-of-work seed and a proof-of-work problem having the proof-of-work seed as the solution. As described above, asymmetric functions such as the discrete logarithm problem may be used as the proof-of-work so that the server is not unreasonably burdened. At block 1016, the server sends the proof-of-work problem to the client.

At block 1018, the server combines the key seed value, the proof-of-work seed and the pre-master secret to produce a master secret that matches the master secret generated by the client. In some implementations, the proof-of-work problem is sent to the client and the CAPTCHA problem is omitted. In another implementation, CAPTCHA problems are generated by the client and the server and exchanged. In yet another implementation, both a proof-of-work problem and a CAPTCHA are provided as alternatives to be solved by the receiving party. When both a proof-of-work problem and the CAPTCHA are provided, the proof-of-work problem and the CAPTCHA may be configured to produce matching results, and the solution to either may be used to generate the master secret.

The preceding and following description refers to random numbers, randomly generated numbers, pseudo-randomly generated numbers and pseudorandom numbers. These terms refer to the generation of values that appear to lack a discernible pattern, appear random to a human observer, or satisfy certain statistical tests for randomness. Random numbers may be generated using true or pseudorandom methods. True random number methods may rely on an entropy source such as atmospheric noise, thermal noise or electromagnetic or other physical phenomena. Pseudorandom methods may be built on linear feedback shift registers or cryptographically secure pseudorandom number generators. In many environments, numbers generated with true random or pseudorandom processes are interchangeable. In the present document, a number generated with any these techniques may be referred to as a random number or a randomly generated number.

Figure 11:
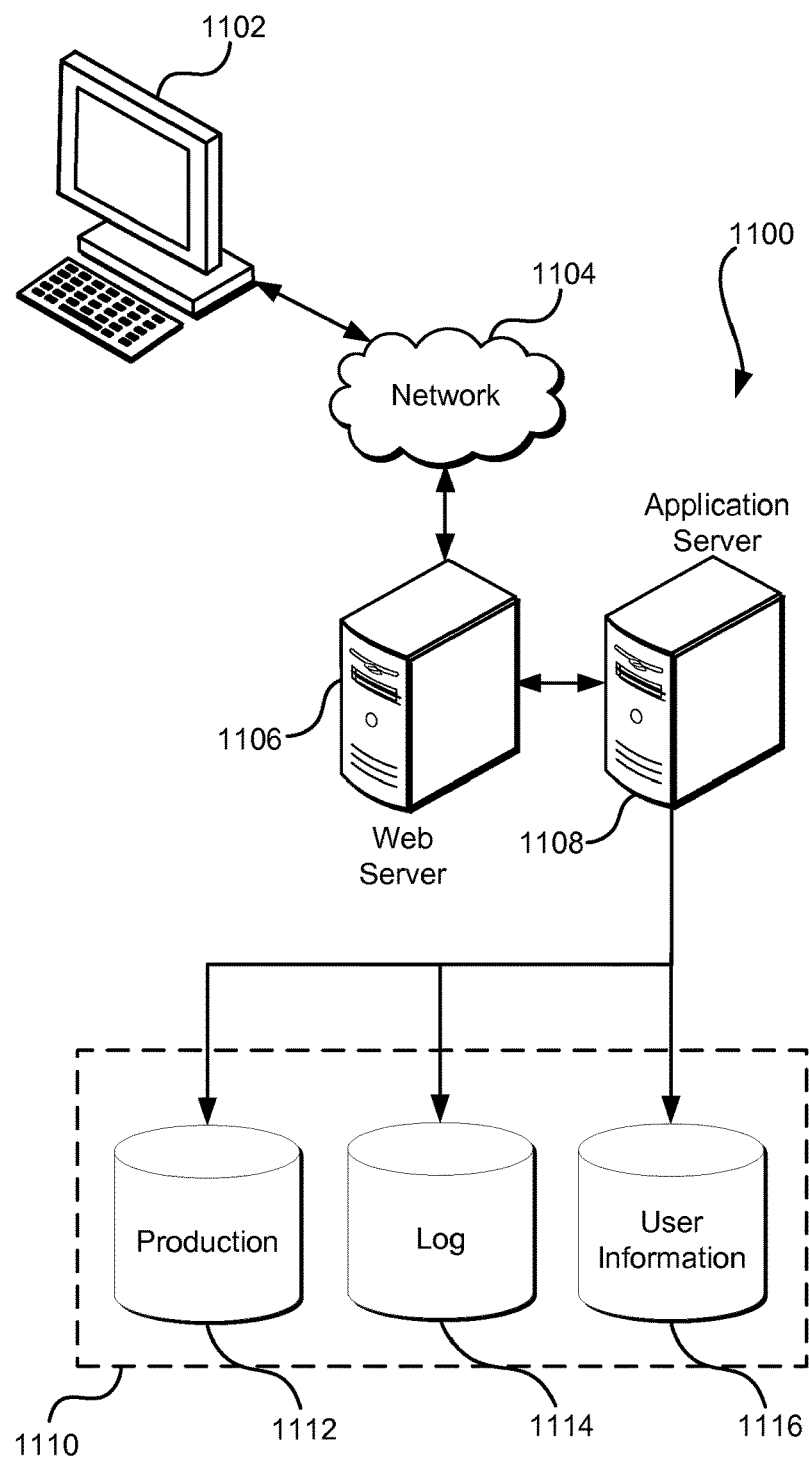
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part on the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In the preceding and following description, various techniques are described. For purposes of explanation, specific configurations and details are set forth in order to provide a thorough understanding of possible ways of implementing the techniques. However, it will also be apparent that the techniques described in this document may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising at least one computing device implementing one or more services, wherein the one or more services:
   generate a CAPTCHA that has a corresponding answer value;
   provide the CAPTCHA to a client computer system as part of a handshake that establishes a shared secret, the shared secret based at least in part on the answer value;

establish an encrypted network connection between the system and the client computer system using the shared secret;

generate a cryptographic key based at least in part on the answer value; and use the cryptographic key to perform cryptographic operations on messages transmitted between the client computer system and the system.

2. The system of claim 1, wherein:

the one or more services are further configured to:

generate a proof-of-work problem, the proof-of-work problem having a solution; and provide the proof-of-work problem to the client; and the cryptographic key is based at least in part on the solution.

3. The system of claim 1, wherein the one or more services are further configured to provide the CAPTCHA to the client as part of a handshake that establishes a network connection to the client.

4. The system of claim 1, wherein:

the one or more services are further configured to store the CAPTCHA on a CAPTCHA server that is configured to provide the CAPTCHA to the client; and the CAPTCHA is provided to the client at least by providing a reference to the CAPTCHA, the reference identifying the CAPTCHA stored on the CAPTCHA server.

5. The system of claim 1, wherein:

the cryptographic key is stored on a cryptographic service; and the answer value represents a reference to the cryptographic key stored on the cryptographic service.

6. The system of claim 1, wherein the CAPTCHA comprises one or more of an image-based CAPTCHA, a video-based CAPTCHA, or an audio-based CAPTCHA.

7. The system of claim 1, wherein:

the CAPTCHA is provided to the client over a Transport Layer Security ("TLS") handshake in an extended "Server hello" message; and the extended "Server hello" message includes an extension that includes information that describes the CAPTCHA.

8. The system of claim 1, wherein:

the one or more services are further configured to receive a pre-master secret from the client; and the cryptographic key is determined at least in part by combining the answer value with the pre-master secret.

9. A non-transitory computer-readable storage medium having stored thereon executable instructions that, as a result of being executed by one or more processors of a computer system, cause the computer system to at least:

receive, as part of a handshake that establishes an encrypted network connection between the computer system and a server, information that specifies a CAPTCHA, the CAPTCHA being more difficult for an automated agent to interpret than by a human, where a proposed solution to the CAPTCHA is computationally less intensive to verify than the CAPTCHA is to solve by a second computer system;

acquire an answer associated with the CAPTCHA;

establish a shared secret, the shared secret based at least in part on the answer;

establish an encrypted network connection with the server using the shared secret generate a cryptographic key based at least in part on the answer associated with the CAPTCHA; and cryptographically protect communications with the server using the cryptographic key.

10. The non-transitory computer-readable storage medium of claim 9, wherein the instructions further comprise instructions that, as a result of being executed by the one or more processors, cause the computer system to:

receive a digital certificate having a public key from the server;

generate a pre-master secret;

encrypt the pre-master secret with the public key;

provide the pre-master secret to the server; and generate the cryptographic key by at least in part combining the pre-master secret with the answer associated with the CAPTCHA.

11. The non-transitory computer-readable storage medium of claim 10, wherein the CAPTCHA comprises one or more of an image-based CAPTCHA, a video-based CAPTCHA, or an audio-based CAPTCHA.

12. The non-transitory computer-readable storage medium of claim 11, wherein the instructions further comprise instructions that, as a result of being executed by the one or more processors, cause the computer system to present the CAPTCHA on a user interface at least in part by presenting the CAPTCHA on a mobile device via a computer network.

13. The non-transitory computer-readable storage medium of claim 9, wherein the instructions further comprise instructions that, as a result of being executed by the one or more processors, cause the computer system to:

receive information that describes a proof-of-work problem from the server;

acquire a proof-of-work solution by at least in part solving the proof-of-work problem; and combine the proof-of-work solution with the answer associated with the problem.

14. The non-transitory computer-readable storage medium of claim 9, wherein the cryptographic key is based at least in part on a value received from the server, a random value, the answer associated with the CAPTCHA, and a solution to a proof-of-work problem received from the server.

15. The non-transitory computer-readable storage medium of claim 9, wherein:

the answer is a reference to the cryptographic key which is stored on a cryptographic service; and the cryptographic key is acquired at least in part by retrieving the cryptographic key from the cryptographic service using the reference.

16. The non-transitory computer-readable storage medium of claim 15, wherein the instructions further comprise instructions that, as a result of being executed by the one or more processors, cause the computer system to cause the cryptographic key to be removed from the cryptographic service.

17. A computer-implemented method comprising:

receiving information that specifies a CAPTCHA;

providing a solution to the CAPTCHA;

generating a key seed value from the solution to the CAPTCHA;

establishing a shared secret, the shared secret based at least in part on the solution;

providing the shared secret as part of a handshake to establish a network connection;

generating a cryptographic key based at least in part on the solution; and cryptographically verifying communications over the network connection using a digital signature based at least in part on the cryptographic key.

18. The computer-implemented method of claim 17, wherein generating the cryptographic key is accomplished at least in part by applying a key stretching algorithm to the key seed value to increase the entropy of the cryptographic key.

19. The computer-implemented method of claim 17, further comprising exchanging data records over the network connection, the data records including a message authentication code generated using a signature key that is based at least in part on the cryptographic key.

20. The computer-implemented method of claim 17, wherein the key seed value is converted to a human readable character sequence in the form of pronounceable words, phrases, or phonetic sequences.

* * * * *